(12) United States Patent
Sabhapathy

(10) Patent No.: US 8,747,060 B2
(45) Date of Patent: Jun. 10, 2014

(54) COOLING AND CLIMATE CONTROL SYSTEM AND METHOD FOR A WIND TURBINE

(75) Inventor: Peri Sabhapathy, Northville, MI (US)

(73) Assignee: Gamesa Innovation & Technology, S.L., Sarriguren (ES)

( * ) Notice: Subject to any disclaimer, the term of this patent is extended or adjusted under 35 U.S.C. 154(b) by 491 days.

(21) Appl. No.: 13/238,042

(22) Filed: Sep. 21, 2011

(65) Prior Publication Data
US 2013/0071236 A1 Mar. 21, 2013

(51) Int. Cl.
F03D 11/00 (2006.01)

(52) U.S. Cl.
USPC .............................. 415/175; 415/178; 290/55

(58) Field of Classification Search
USPC .................... 415/175–178; 416/93 R; 290/55
See application file for complete search history.

(56) References Cited

U.S. PATENT DOCUMENTS

| 6,439,832 | B1 | 8/2002 | Siegfriedsen |
| 6,520,737 | B1 | 2/2003 | Fischer et al. |
| 7,111,668 | B2 | 9/2006 | Rurup |
| 7,168,251 | B1 * | 1/2007 | Janssen ........................ 60/641.1 |
| 7,837,126 | B2 | 11/2010 | Gao |
| 2008/0290662 | A1 * | 11/2008 | Matesanz et al. ............... 290/44 |
| 2009/0289461 | A1 | 11/2009 | Larsen |
| 2010/0061853 | A1 | 3/2010 | Bagepalli |

FOREIGN PATENT DOCUMENTS

| CA | 2 714 839 A1 | 3/2011 |
| WO | 2010/069954 A1 | 6/2010 |

* cited by examiner

Primary Examiner — Edward Look
Assistant Examiner — Danielle M Christensen
(74) Attorney, Agent, or Firm — Ladas & Parry LLP

(57) ABSTRACT

A system to cool the air inside a nacelle of a wind turbine. The system has an upper cooling circuit, with a reservoir disposed below the nacelle. The reservoir has at least one pair of annular chambers and a lid that freely rotates about its axis and about the nacelle yaw axis. Coolant flows from a first annular chamber to a second annular chamber through a heat exchanger in the nacelle, thereby carrying heat from the nacelle to the second annular chamber. The system also has a lower cooling circuit, having a coil that connects the first annular chamber to the second annular chamber and being exposed to the outside of the wind turbine. Coolant flows from the second annular chamber to the first annular chamber through the coil, thereby dissipating the heat to ambient air.

20 Claims, 4 Drawing Sheets

COOLING AND CLIMATE CONTROL SYSTEM AND METHOD FOR A WIND TURBINE

BACKGROUND OF THE INVENTION

1. Field of the Invention

The present invention generally relates to an integrated cooling and climate control system and method for a wind turbine, and more particularly to systems and methods to cool the air inside the nacelle and the heat generating components of a wind turbine such as the drivetrain, the electrical generator, the converter, and the transformer.

2. Related Art

A wind turbine converts the kinetic energy of wind into electrical energy through its rotor, drivetrain, electrical generator, and converter. An electrical transformer converts the low voltage output from the converter into a high voltage output before the output is sent to the substation at the wind farm. The wind turbine nacelle houses these mechanical and electrical components, namely, the drivetrain, the electrical generator, the converter, and the transformer (usually located in the nacelle to reduce the power loss due to low voltage electrical transmission). The nacelle also houses the components of the hydraulic system needed for blade pitching and nacelle yawing.

These components generate a significant amount of heat while the wind turbine is operating. For their protection and their efficient operation, the heat generated by these components has to be continuously removed. This is typically done by circulating a coolant through the heat exchangers built into these components. The coolant then transports the heat from these components and dissipates it to the ambient air with the help of air cooled radiators mounted on the outside of the nacelle.

The coolant could be any fluid that is typically used in low temperature heat exchangers, such as a mixture of ethylene glycol and water that does not freeze during cold weather. It is noted that the heat generated by the drivetrain, and that by the hydraulic system, is dissipated to the coolant through liquid-to-liquid heat exchangers in the lubricating oil and the hydraulic fluid sumps, respectively. The airflow inside the nacelle over the heat generating components also helps cool them on the outside. The ambient air usually enters through one or more inlets at the nacelle bottom, and the warmer air exits to the outside through the outlets at the nacelle top. Outlet fans help the airflow through the nacelle and over the heat generating components. Thus, the ambient air is typically used as a heat sink to cool the heat generating components of a wind turbine. The air inside the nacelle can also be cooled by an optional coolant-to-air exchanger.

SUMMARY OF THE INVENTION

The inventor of the present invention notes that there are various drawbacks to prior art systems. The fans that force the airflow through the radiators are noisy, failure prone, and consume power. Moreover, the radiators occupy valuable space on the nacelle top and could interfere with the helipads that are used for landing helicopters on the nacelle top, for example to transport people to do maintenance. This is especially important in offshore wind turbine installations. Moreover, in an offshore environment, the ambient air has high humidity and carries water droplets and salt particles with it. Therefore, a closed airflow system is more effective in preventing corrosion and electrical short circuits than an open airflow system that is typically used onshore. A closed airflow system necessitates a means to cool the air inside the nacelle.

The present invention in one embodiment provides an integrated cooling and climate control system that uses the airflow due to the wind to dissipate the heat from the coolant. The system can permit nacelle yawing and does not use air cooled radiators. The system not only helps cool the heat generating components such as the drivetrain, the electrical generator, and the converter, but also helps cool the air inside the nacelle. The airflow can be either closed or open.

The present invention uses the ambient air as the heat sink. The coolant could be any fluid that is typically used in low temperature heat exchangers, such as a mixture of ethylene glycol and water that does not freeze during the cold weather. The system can not only help cool the heat generating components such as the drivetrain, the electrical generator, and the converter, but can also help cool the air inside the nacelle.

One notable feature of the present invention is a cylindrical reservoir that rests on a platform inside the tower just below the lower part of the nacelle. The reservoir is hollow in the center and has multiple pairs of annular chambers. In a basic case, the reservoir has only one pair of chambers and contains only the coolant. The two chambers are separated by a circular wall in the middle. The height of this wall is lower than the inner and outer walls of the reservoir. The vertical axes of the reservoir and its lid are coincident with the nacelle yaw axis. The reservoir lid can freely rotate about its axis.

The reservoir separates the cooling system of the present invention into two parts: a lower cooling circuit and an upper cooling circuit. The two reservoir chambers are connected at the bottom through tubes and a cooling coil that wraps around the tower outside. Thus, in the lower cooling circuit, the coolant flows from one chamber to the other only through the cooling coil. The cooling coil is supported by one or more platforms on the tower outside. The platform can also act as a sun shade to minimize the solar heat load on the coil during mid-day sun. The coil is located below the reservoir and thus it is always flooded with the coolant. Whenever the coolant level in any of the reservoir chambers is altered, because of the resulting hydraulic head, the coolant flows from the chamber with a higher coolant level to the second chamber through the cooling coil to equilibrate the coolant levels in both chambers. As the coolant flows through the coil, it is cooled by ambient airflow due to the wind. The heat dissipation from the coolant to the ambient air can be augmented by fins on the coil outside (the air side) or in the coil inside (the coolant side) or both. The coolant flow in the lower circuit can also be augmented by a fluid pump.

In the upper cooling circuit, one or more pumps in the nacelle transport the coolant from the first chamber of the reservoir through the coolant-to-oil heat exchanger (to cool the drive train), the generator, the converter, the coolant-to-hydraulic fluid heat exchanger (to cool the hydraulic fluid), and the coolant-to-air heat exchanger (to cool the nacelle air), thereby picking up the heat from these components or fluids and returning the warmer coolant to the second chamber. Due to the hydraulic force arising from the extra volume of coolant and the higher coolant level in the second chamber, the coolant flows from the second chamber to the first chamber through the cooling coil on the tower outside and thus dissipates the heat to the ambient air. Air ducts and one or more blowers in the nacelle help direct the cooler air from coolant-to-air heat exchanger to the hotspots such as the transformer and return the warmer air to the heat exchanger, thus cooling the air in the nacelle.

The inlet and outlet pipes of the upper cooling circuit go through openings in the reservoir lid. Moreover, these pipes freely hang inside their respective annular reservoir chambers. As the nacelle yaws to direct the rotor blades towards the wind direction, these inlet and outlet pipes freely rotate inside their respective reservoir chambers along with the reservoir lid. The hollow open space in the center of the reservoir and the corresponding open space in the platform provide the access path between the nacelle and the tower, for example, for the electrical lines from the nacelle to the tower bottom. If the reservoir outer diameter is smaller than the tower inside diameter, additional access paths from the tower to the nacelle can be created through openings in the platform in the space between the reservoir and the tower inside.

A second embodiment of the present invention is a variation of the first embodiment and involves an open airflow through the turbine with the coolant-to-air heat exchanger inside the nacelle being an option. The clean ambient air enters the tower and/or the nacelle through one or more inlets, flows over and cools the heat generating components (e.g., the drivetrain, the generator, the converter, and the transformer), and the warm air exits the nacelle rear top. Except for the method of airflow through the nacelle and the ventilation, this configuration is similar to that discussed previously. This configuration is mainly suited for an onshore turbine.

In a third embodiment of the present invention, the heat carried by the lubricating oil and the hydraulic fluid is directly dissipated to the ambient air. In this embodiment, the annular cylindrical reservoir has a separate pair of annular fluid chambers, a fluid pump, and a cooling coil on the tower outside for each of the fluids (coolant, lubricating oil, and hydraulic fluid) that help cool the heat generating components in the nacelle. Each pair of the reservoir chambers is completely separated from one another to prevent mixing of fluids. Thus, in addition to the coolant, the lubricating oil and the hydraulic fluid have independent flow circuits and dissipate the heat directly to the ambient air. This helps minimize the thermal inefficiencies associated with the use of coolant-to-oil and coolant-to-hydraulic fluid heat exchangers.

The height of the circular wall separating the two chambers of a particular pair of the reservoir chambers is such that the wall permits overflow of the fluid from one chamber to the other in case the fluid level in one chamber becomes exceedingly high for any reason. This ensures that there is always a minimum volume of the fluid in either of a particular pair of chambers. If it is necessary, a fluid pump can be used in any of the lower cooling circuits to increase the fluid velocity of that circuit, thus augmenting the heat dissipation from that fluid to the ambient air. To maintain the desired fluid temperatures and flow rates, thermostatically controlled flow bypasses can also be used in the upper or lower flow circuits.

The present invention according to one embodiment provides a system to cool the air inside a nacelle of a wind turbine. The system comprises an upper cooling circuit, having a reservoir disposed below the nacelle, the reservoir having (1) at least one pair of annular chambers, and (2) a lid that freely rotates about its axis and about the nacelle yaw axis. Coolant flows from a first annular chamber to a second annular chamber through a heat exchanger in the nacelle, thereby carrying heat from the nacelle to the second annular chamber. The system also comprises a lower cooling circuit, having a coil that connects the first annular chamber to the second annular chamber and is exposed to an outside of the wind turbine. The coolant flows from the second annular chamber to the first annular chamber through the coil, thereby dissipating the heat to ambient air.

The present invention according to another embodiment provides a system to cool the air inside a nacelle of a wind turbine. The system comprises an upper cooling circuit, having a reservoir disposed below the nacelle, the reservoir having (1) at least one pair of annular chambers, and (2) a lid that freely rotates about its axis and about the nacelle yaw axis. Coolant flows from a first annular chamber to a second annular chamber through a heat exchanger in the nacelle, thereby carrying heat from the nacelle to the second annular chamber. The system also comprises a lower cooling circuit, having a coil that connects the first annular chamber to the second annular chamber and is at least partly exposed to an outside of the wind turbine. The coolant flows from the second annular chamber to the first annular chamber through the coil, thereby dissipating the heat to ambient air. The system further comprises a plurality of inlets and corresponding air treatment units, disposed at a bottom of a tower of the wind turbine and at the nacelle, thereby providing an open airflow through the wind turbine such that clean ambient air enters the tower through one of the inlets, and cools and then exits the nacelle.

The present invention according to another embodiment provides a system to cool the air inside a nacelle of a wind turbine. The system comprises an upper cooling circuit, having a reservoir disposed below the nacelle, the reservoir having (1) a pair of annular fluid chambers separated from each other, and (2) a plurality of independent coils flowing through the chambers and at least partly exposed to the outside of a tower of the wind turbine. Each coil is respectively designated for a coolant, a lubricating oil, and a hydraulic fluid, such that heat from the nacelle is dissipated to the coolant, the lubricating oil, and the hydraulic fluid and is then dissipated to the ambient air.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will be more readily understood from a detailed description of the exemplary embodiments taken in conjunction with the following figures.

The invention will next be described in connection with certain exemplary embodiments; however, it should be clear to those skilled in the art that various modifications, additions, and subtractions can be made without departing from the spirit and scope of the claims.

DETAILED DESCRIPTION OF THE PREFERRED EMBODIMENTS

Figure 1:
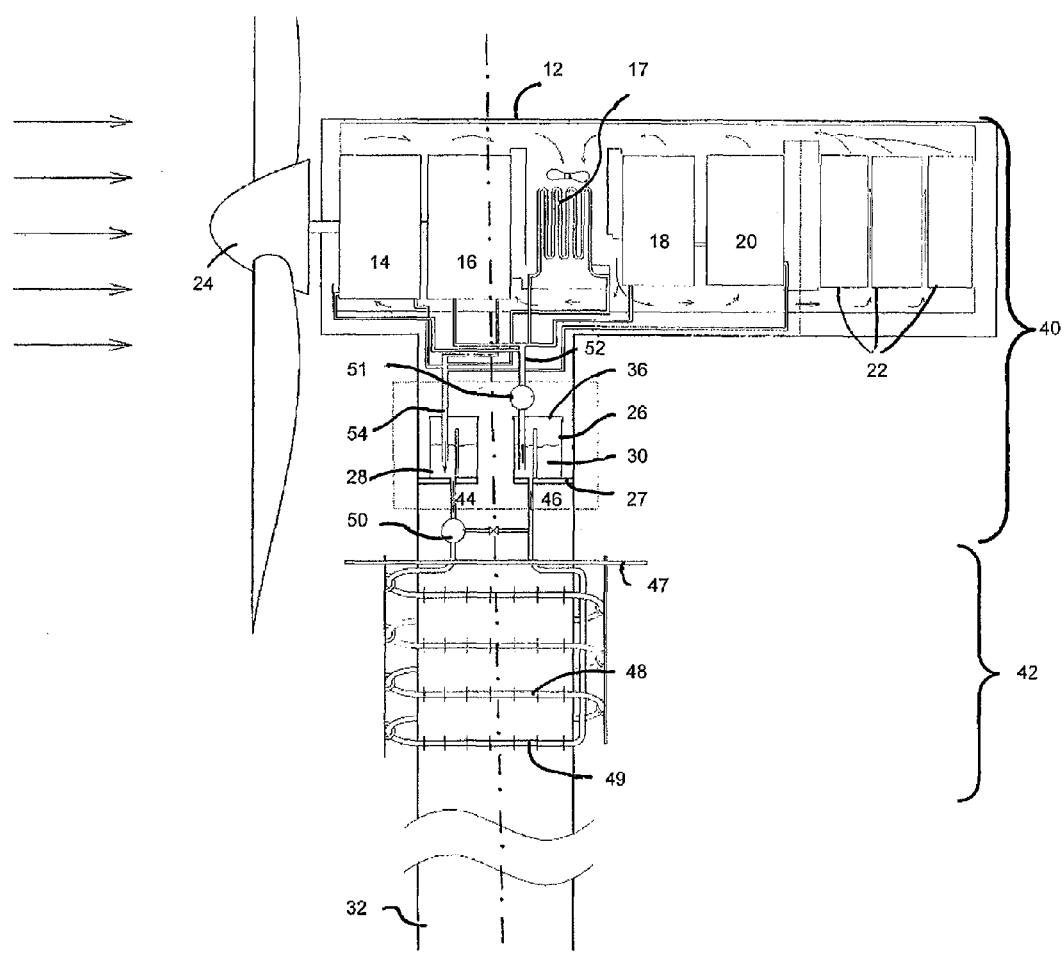
FIGS. 1, 1a, and 1b show a cooling and climate control system in accordance with a first embodiment of the present invention.
Figure 1A:
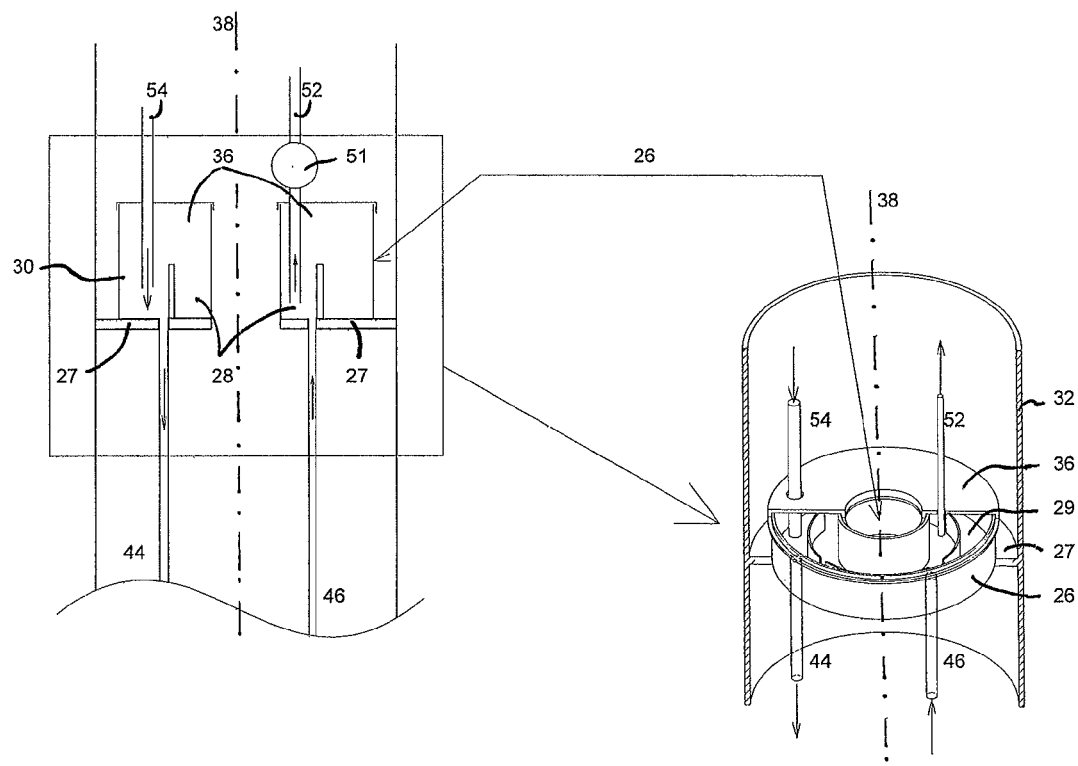
Figure 1B:
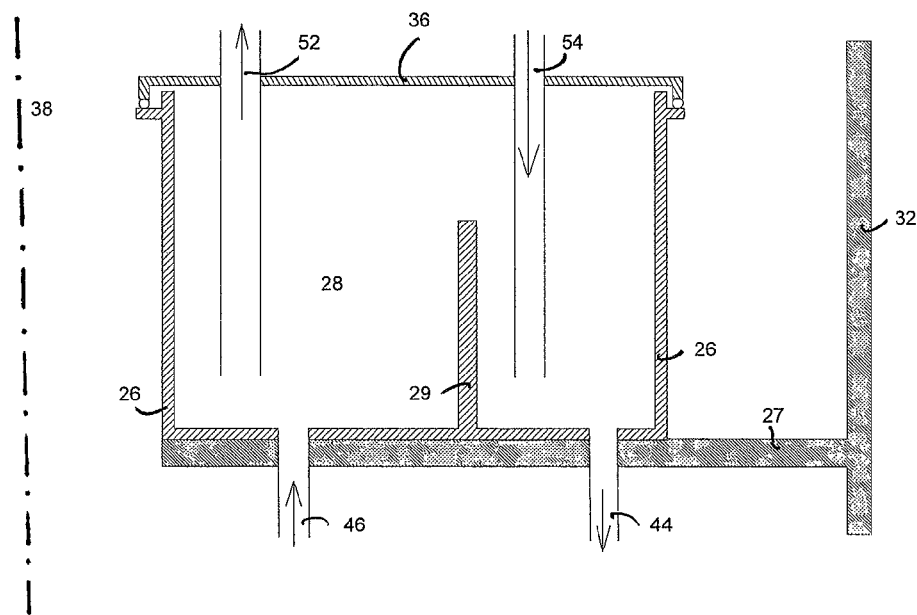

FIG. 1 shows the first embodiment of the cooling and climate control system 100 for a wind turbine according to the present invention. FIGS. 1a and 1b show close-up views of parts of FIG. 1. The system 100 has a nacelle 12 that houses the heat generating components, including the drivetrain (or gear box) 14, the generator 16, the coolant-to-air heat exchanger 17, the hydraulics unit 18, the converter 20, and the transformer 22. On its top, the turbine tower 32 supports the nacelle 12 and the rotor 24.

One notable feature of this system 100 is a cylindrical reservoir 26 that rests on a platform 27 inside the tower 32 just below the lower part of the nacelle 12. The reservoir 26 is hollow in the center and has multiple pairs of annular chambers. In the basic case, the reservoir 26 has only one pair of chambers 28 and 30 and contains only the coolant. The two chambers 28 and 30 are separated by a circular wall 29 in the middle. The height of the dividing wall 29 in the middle is lower than the inner and outer walls of the reservoir 26. The vertical axes of the reservoir 26 and its lid 36 are coincident with the nacelle yaw axis 38. The reservoir lid 36 can freely rotate about its axis.

The reservoir 26 separates the cooling system 100 into two parts: an upper cooling circuit 40 and a lower cooling circuit 42. As will be described in more detail below, in the upper cooling circuit 40, the coolant flows from the first chamber 28 (the inner chamber) of the reservoir 26 to the second chamber 30 (the outer chamber) through the heat exchangers in the nacelle 12, and thus carries with it the heat from the heat generating components and the nacelle air. In the lower cooling circuit 42, the coolant flows from the second chamber 30 (the outer chamber) of the reservoir to the first chamber 28 (the inner chamber), through the liquid-to-air heat exchanger on the tower outside and thus dissipates the heat to the ambient air.

The two reservoir chambers 28 (inner) and 30 (outer) are connected at their respective bottoms though tubes 44 and 46, and a cooling coil 48 that wraps around the outside of the tower 32. Thus, in the lower cooling circuit 42, the coolant flows from one chamber to the other only through the cooling coil 48. The cooling coil 48 is supported by one or more platforms 47 on the outside of the tower 32. The platform 47 can also act as a sun shade to minimize the solar heat load on the coil 48 during the mid-day sun. The cooling coil 48 is located below the reservoir 26 and thus it is always flooded with the coolant. Whenever the coolant level in any of the reservoir chambers 28 and 30 is altered, because of the resulting hydraulic head, the coolant flows from the chamber with higher coolant level to the other chamber through the cooling coil 48 to equilibrate the coolant levels in both chambers 28 and 30. As the coolant flows through the coil 48, it is cooled by the wind. The heat dissipation from the coolant to the ambient air can be augmented by fins 49 on the coil outside (the air side) or in the coil inside (the coolant side) or both. (The fins are shown in the figure as the multiple cross lines across the tube). The coolant flow through the coil 48 can also be augmented by an optional coolant or fluid pump 50 in the lower cooling circuit 42.

In the upper cooling circuit 40, one or more pumps 51 in the nacelle transport the coolant from the first chamber 28 of the reservoir 26 through the coolant-to-oil heat exchanger in the drivetrain 14, the generator 16, the converter 20, the coolant-to-hydraulic fluid heat exchanger 18, and the coolant-to-air heat exchanger 17, thereby picking up the heat from these components or fluids, and returning the warmer coolant to the other chamber 30. Flow restriction devices (not shown in the figure) control the flow rates through these components.

It is noted that the heat generated by the drivetrain 14, and that by the hydraulic system 18, is dissipated to the coolant through liquid-to-liquid heat exchangers (not shown) in the lubricating oil and the hydraulic fluid sumps, respectively. The heat from the air inside the nacelle is dissipated to the coolant through the liquid-to-air heat exchanger 17. One or more blowers (not shown) help direct the cooler air exiting this heat exchanger onto the outer surfaces of the drivetrain 14, the generator 16, the converter 20, and the transformer 22, thus cooling these components from the outside.

Thus, as the coolant flows from the first chamber 28 to the second chamber 30, the heat from the heat generating components in the nacelle 12, and the air inside the nacelle 12, is removed by the upper cooling circuit 40. Due to the hydraulic force arising from the extra volume of coolant, and thus the higher coolant level in the second chamber, the coolant flows from the second chamber to the first chamber through the cooling coil 48 on the outside of the tower 32 and thus dissipates the heat to the ambient air. Air ducts and one or more blowers (not shown) in the nacelle 12 help direct the cooler air from the coolant-to-air heat exchanger to the hotspots such as the transformer 22 and return the warmer air to the heat exchanger, thus cooling the air in the nacelle 12.

The inlet and outlet pipes 52 and 54 of the upper cooling circuit go through openings in the reservoir lid 36. Moreover, these pipes freely hang inside their respective annular reservoir chambers 28, 30. As the nacelle 12 yaws to direct the rotor blades 24 towards the wind direction, these inlet and outlet pipes freely rotate inside their respective reservoir chambers along with the reservoir lid 36. The hollow open space in the center of the reservoir and the corresponding open space in the platform provide the access path between the nacelle 12 and the bottom of the tower 32, for example, for the electrical lines from the nacelle 12 to the bottom of the tower 32. If the outer diameter of the reservoir 26 is smaller than the inside diameter of the tower 32, additional access paths from the tower 32 to the nacelle 12 can be created through openings in the platform in the space between the reservoir 26 and the inside of the tower 32.

Figure 2:
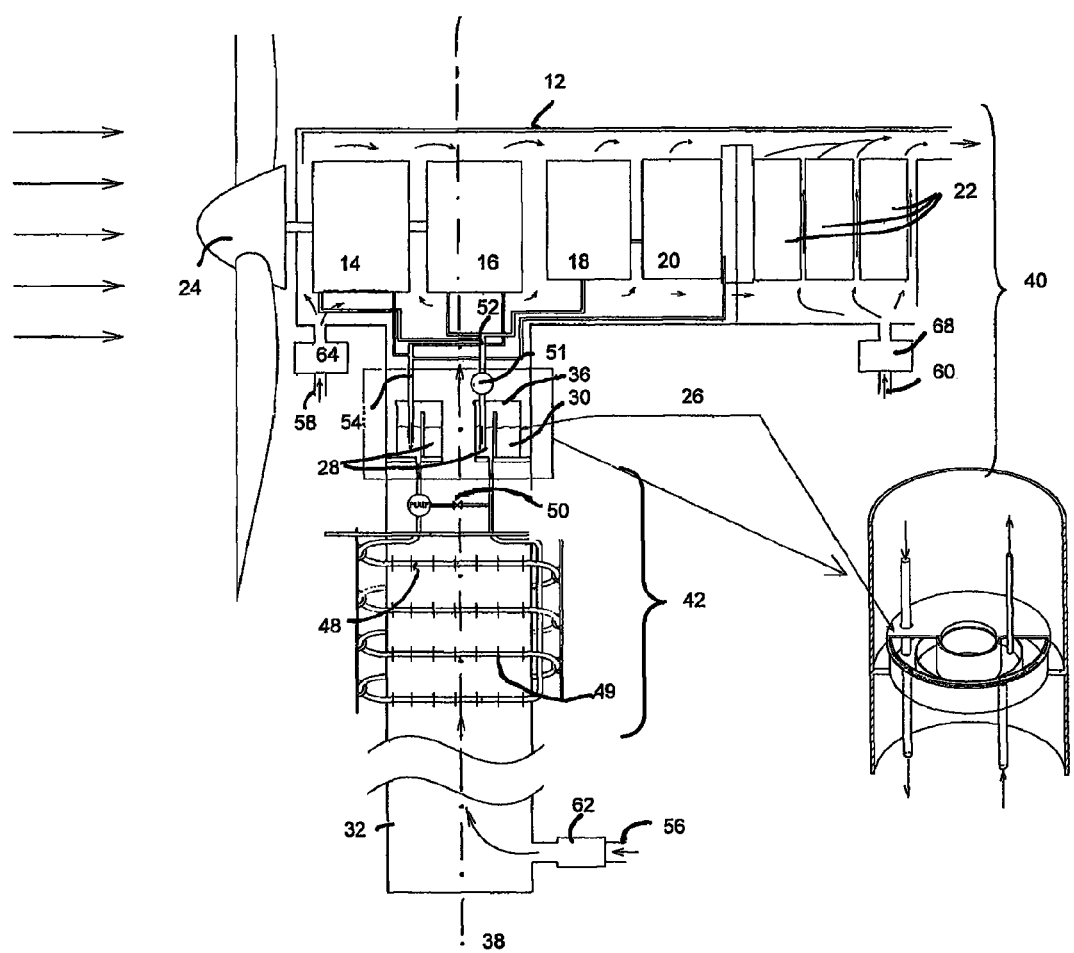
FIG. 2 shows a second embodiment of the cooling and climate control system of the present invention, which is a variation of the first embodiment and has an open airflow through the turbine.

FIG. 2 shows a second embodiment of the present invention, which is a variation of the first embodiment. The system 200 of FIG. 2 has an open airflow through the turbine. The clean ambient air enters the tower 32 and/or the nacelle 12 through one or more inlets (non-limiting examples are 56, 58, 60) where it enters respective air treatment units 62, 64, 68, flows over and cools the heat generating components (e.g., the drivetrain 14, the generator 16, the converter 20, and the transformer 22), and the warm air exits the rear top of the nacelle 12. Thus, the turbine can be ventilated continuously to maintain the desired air temperature inside the nacelle 12. Additional cooling of air inside the nacelle 12 by a coolant-to-air heat exchanger (similar to the heat exchanger 17 in FIG. 1) is optional. Except for the method of cooling the air inside the nacelle 12 (ventilation), this configuration is similar to that of FIG. 1, discussed previously. This configuration is mainly suited for an onshore turbine where the component corrosion due to high humidity and salt is not a major issue.

Figure 3:
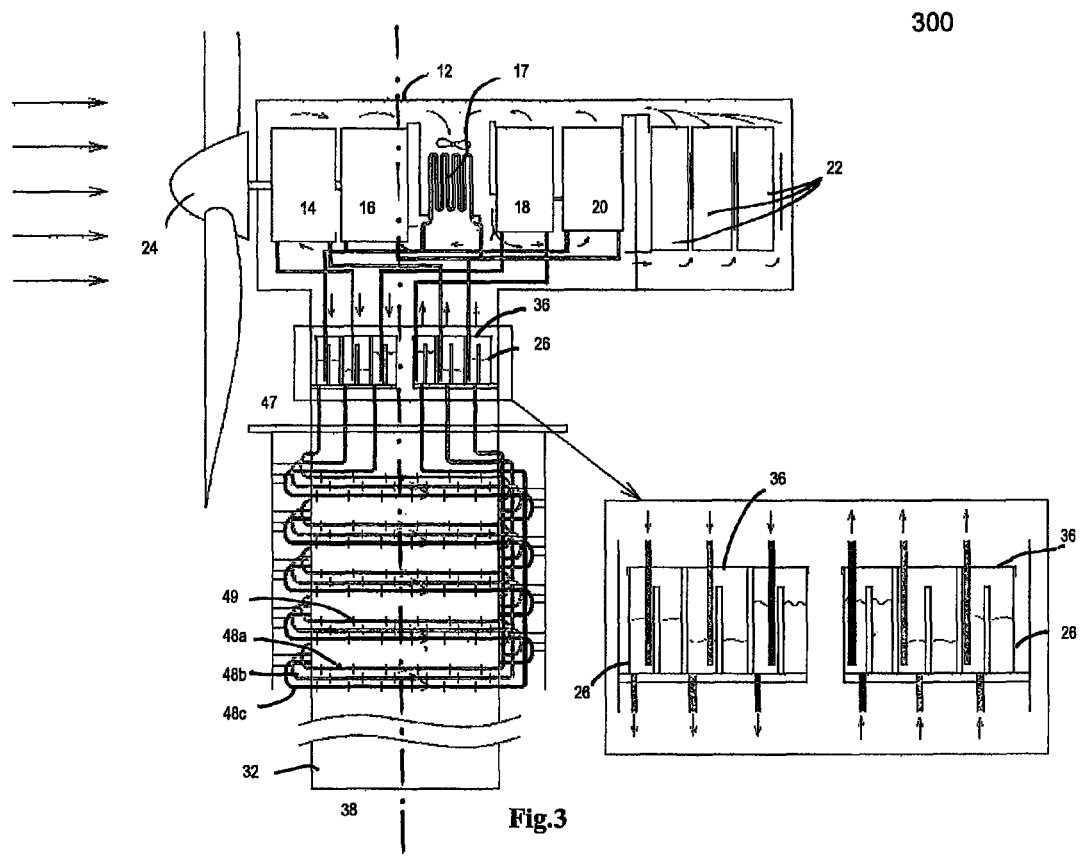
FIGS. 3 and 3a show a cooling and climate control system in accordance with a third embodiment of the present invention, wherein the coolant, the lubricating oil, and the hydraulic fluid independently and directly dissipate the heat to the ambient air.
Figure 3A:
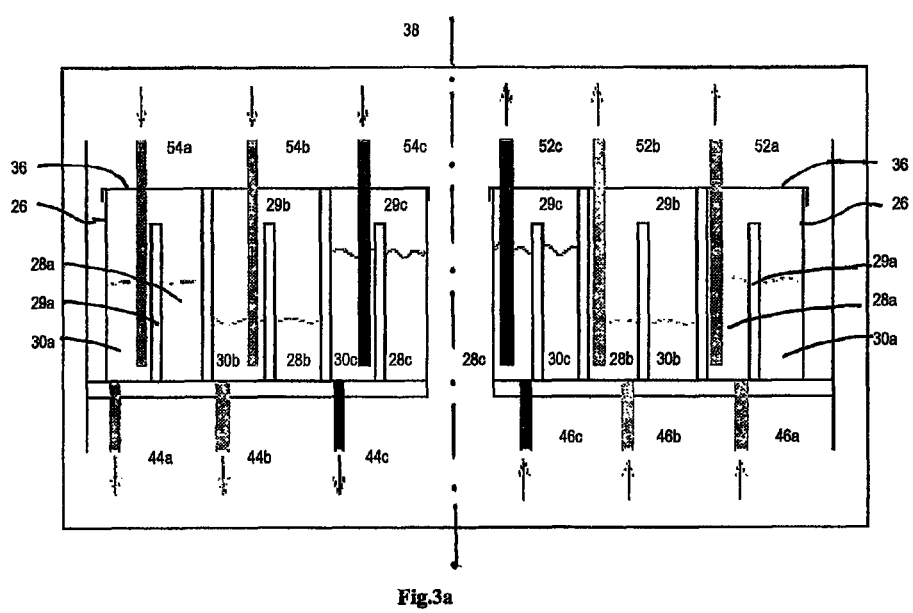

As indicated previously, in the first embodiment of the system of the present invention, the heat generated by the drivetrain 14, and the heat generated by the hydraulic components 18, is first transferred to the coolant through liquid-to-liquid heat exchangers in the lubricating oil and hydraulic fluid sumps, respectively, then transported by the coolant to the outside of the tower 32 and finally dissipated to the ambient air. It is noted that, in addition to picking up the heat from the lubricating oil and the hydraulic fluid, the coolant in the upper cooling circuit 40 also picks up the heat from the generator 16, the converter 20, and the coolant-to-air heat exchanger and dissipates it to the ambient air. In the third embodiment of the system 300 of the present invention, as shown in FIG. 3, the heat carried by the lubricating oil and the hydraulic fluid is directly dissipated to the ambient air. FIG. 3a shows a close-up view of parts of FIG. 3.

Thus, FIGS. 3 and 3a show the third embodiment of the cooling and climate control system for a wind turbine where the coolant, the lubricating oil, and the hydraulic fluid independently and directly dissipate the heat to the ambient air. In this system, the annular cylindrical reservoir 26 has a separate pair of annular fluid chambers (28a and 30a, 28b and 30b, and 28c and 30c, for the coolant, the lubricating oil and the hydraulic fluid, respectively), a flow pump (in the upper cooling circuit) (not shown) (similar to 51 in FIG. 1 for each of the three fluid circuits), and respective cooling coils 48a, 48b and 48c (for the coolant, the lubricating oil, and the hydraulic fluid, respectively) on the outside of the tower 32 for each of the fluids (coolant, lubricating oil, and hydraulic fluid) that help cool the heat generating components in the nacelle 12. The pairs of these chambers (28a and 30a, 28b and 30b, and 28c and 30c) are fully separated from one another to prevent mixing of fluids. As described before, the bottom each of the pair of chambers (28a and 30a, 28b and 30b, and 28c and 30c for the coolant, the lubricating oil and the hydraulic fluid, respectively) is connected through the respective inlet and outlet pipes (52a and 54a, 52b and 54b, and 52c and 54c, for the coolant, the lubricating oil and the hydraulic fluid, respectively) and their respective cooling coils 48a, 48b and 48c. The turbine is sealed (closed airflow system) and the heat from the nacelle air is dissipated to the coolant through a coolant-to-air heat exchanger. The fluid pumps in the upper cooling circuits, and the optional fluid pumps in the lower cooling circuits and the bypass valves are not shown in the figure for clarity. As described before, the reservoir lid 36 rotates freely over the reservoir 26 when the nacelle yaws. And the inlet pipes (52a, 52b and 52c for the coolant, lubricating oil and the hydraulic fluid, respectively) and outlet pipes (54a, 54b and 54c for the coolant, lubricating oil and the hydraulic fluid, respectively) also rotate freely inside their respective fluid chambers.

Accordingly, in addition to the coolant, the lubricating oil and the hydraulic fluid have independent flow circuits and dissipate the heat directly to the ambient air. This helps minimize the thermal inefficiencies associated with the use of coolant-to-oil and coolant-to-hydraulic fluid heat exchangers.

It is noted that the height of the circular wall separating the two chambers of a particular pair of the reservoir chambers is such that the wall permits overflow of the fluid from one chamber to the other in case the fluid level in one chamber becomes exceedingly high for any reason. This can ensure that there is always a minimum volume of the fluid in either of a particular pair of chambers. As indicated before, the heat dissipation from a particular fluid to the ambient air can be augmented by fins on the coil outside (the air side) or in the coil inside (the liquid side) or both. If necessary, a fluid pump can also be used in any of the lower cooling circuits to increase the fluid velocity of that circuit, and thus augmenting the heat dissipation from that fluid to the ambient air. To maintain the desired fluid temperatures, thermostatically controlled flow bypasses can also be used in the upper or lower flow circuits. The fluid chambers, the fluid volumes, the pumps, the bypass valves, and the coils that dissipate the heat from the fluids to the ambient air can be sized appropriately to meet the design needs of the particular turbine.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

Having described the invention, what is claimed as new and secured by Letters Patent is:

1. A system to cool the air inside a nacelle of a wind turbine, comprising:
   an upper cooling circuit, having a reservoir disposed below the nacelle, the reservoir having (1) at least one pair of annular chambers, and (2) a lid that freely rotates about its axis and about the nacelle yaw axis, wherein coolant flows from a first annular chamber to a second annular chamber through a heat exchanger in the nacelle, thereby carrying heat from the nacelle to the second annular chamber; and
   a lower cooling circuit, having a coil that connects the first annular chamber to the second annular chamber and is exposed to an outside of the wind turbine, wherein the coolant flows from the second annular chamber to the first annular chamber through the coil, thereby dissipating the heat to ambient air.

2. The system of claim 1, wherein the reservoir is cylindrical and is supported by a platform inside a tower of the wind turbine.

3. The system of claim 2, wherein corresponding open spaces in the reservoir and the platform provide an access path between the nacelle and the tower.

4. The system of claim 1, wherein the coil is wrapped around the outside of a tower of the wind turbine.

5. The system of claim 1, wherein the coil is supported by one or more platforms on the outside of the tower.

6. The system of claim 1, wherein fins are located inside and outside the coil to help dissipate the heat from the coolant to the ambient air.

7. The system of claim 1, wherein, when a coolant level is higher in one chamber than in the other, the coolant flows from the one chamber to the other chamber through the coil to equilibrate the coolant levels in both chambers.

8. The system of claim 1, wherein the lower cooling circuit further comprises a coolant pump to augment the coolant flow through the coil.

9. The system of claim 1, wherein the upper cooling circuit further comprises at least one pump to help transport the coolant from the first annular chamber through the nacelle to the second annular chamber, thereby collecting heat from the nacelle and returning the warmer coolant to the second annular chamber.

10. The system of claim 1, wherein each annular chamber has a circular wall for separating coolant therein, and wherein the height of the circular wall in a given chamber is lower than the height of the inner and outer walls of said chamber.

11. A system to cool the air inside a nacelle of a wind turbine, comprising:
- an upper cooling circuit, having a reservoir disposed below the nacelle, the reservoir having (1) at least one pair of annular chambers, and (2) a lid that freely rotates about its axis and about the nacelle yaw axis, wherein coolant flows from a first annular chamber to a second annular chamber through a heat exchanger in the nacelle, thereby carrying heat from the nacelle to the second annular chamber;
- a lower cooling circuit, having a coil that connects the first annular chamber to the second annular chamber and is at least partly exposed to an outside of the wind turbine, wherein the coolant flows from the second annular chamber to the first annular chamber through the coil, thereby dissipating the heat to ambient air; and
- a plurality of inlets and corresponding air treatment units, disposed at a bottom of a tower of the wind turbine and at the nacelle, thereby providing an open airflow through the wind turbine such that clean ambient air enters the tower through one of the inlets, and cools and then exits the nacelle.

12. The system of claim 11, wherein the reservoir is cylindrical and is supported by a platform inside a tower of the wind turbine.

13. The system of claim 12, wherein corresponding open spaces in the reservoir and the platform provide an access path between the nacelle and the tower.

14. The system of claim 11, wherein the coil is wrapped around the outside of a tower of the wind turbine and is supported by one or more platforms on the outside of the tower.

15. The system of claim 11, wherein fins are located inside and outside the coil to help dissipate the heat from the coolant to the ambient air.

16. The system of claim 11, wherein, when a coolant level is higher in one chamber than in the other, the coolant flows from the one chamber to the other chamber through the coil to equilibrate the coolant levels in both chambers.

17. The system of claim 11, wherein the lower cooling circuit further comprises a coolant pump to augment the coolant flow through the coil.

18. The system of claim 11, wherein the upper cooling circuit further comprises at least one pump to help transport the coolant from the first annular chamber through the nacelle to the second annular chamber, thereby collecting heat from the nacelle and returning the warmer coolant to the second annular chamber.

19. The system of claim 11, wherein each annular chamber has a circular wall for separating coolant therein, and wherein the height of the circular wall in a given chamber is lower than the height of the inner and outer walls of said chamber.

20. A system to cool the air inside a nacelle of a wind turbine, comprising:
- an upper cooling circuit, having a reservoir disposed below the nacelle, the reservoir having (1) a pair of annular fluid chambers separated from each other, and (2) a plurality of independent coils flowing through the chambers and at least partly exposed to the outside of a tower of the wind turbine,
- wherein each coil is respectively designated for a coolant, a lubricating oil, and a hydraulic fluid, such that heat from the nacelle is dissipated to the coolant, the lubricating oil, and the hydraulic fluid and is then dissipated to the ambient air.

\* \* \* \* \*